United States Patent
Mugura et al.

(10) Patent No.: US 7,334,192 B2
(45) Date of Patent: Feb. 19, 2008

(54) SYSTEM AND METHOD FOR ENABLING MANIPULATION OF GRAPHIC IMAGES TO FORM A GRAPHIC IMAGE

(75) Inventors: Kazuto Mugura, San Francisco, CA (US); Eduardo Sciammarella, New York, NY (US); Scott Kravitz, San Francisco, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 121 days.

(21) Appl. No.: 11/444,651

(22) Filed: May 31, 2006

(65) Prior Publication Data
US 2006/0218508 A1 Sep. 28, 2006

Related U.S. Application Data

(60) Division of application No. 10/171,476, filed on Jun. 13, 2002, now Pat. No. 7,093,203, which is a continuation of application No. 09/556,049, filed on Apr. 21, 2000, now abandoned, which is a continuation of application No. 09/006,544, filed on Jan. 13, 1998, now abandoned.

(51) Int. Cl.
G06F 3/48 (2006.01)
(52) U.S. Cl. .................................. 715/773
(58) Field of Classification Search ............ 715/784, 715/773, 823, 860
See application file for complete search history.

(56) References Cited

U.S. PATENT DOCUMENTS

| | | | |
|---|---|---|---|
| 3,991,266 A | | 11/1976 | Baer |
| 5,128,672 A | * | 7/1992 | Kaehler ........................ 341/23 |
| 5,353,016 A | * | 10/1994 | Kurita et al. .......... 340/825.22 |
| 5,387,955 A | * | 2/1995 | Cocca ........................ 396/59 |
| 5,406,331 A | | 4/1995 | Barrett |
| 5,414,444 A | * | 5/1995 | Britz ........................ 345/156 |
| 5,422,656 A | | 6/1995 | Allard et al. |
| 5,436,954 A | | 7/1995 | Nishiyama et al. |
| 5,481,659 A | | 1/1996 | Nosaka et al. |
| 5,487,067 A | | 1/1996 | Matsushige |
| 5,521,369 A | | 5/1996 | Kumar |
| 5,533,110 A | * | 7/1996 | Pinard et al. .......... 379/355.01 |
| 5,557,413 A | | 9/1996 | Ebihara et al. |
| 5,615,045 A | | 3/1997 | Takuma et al. |
| 5,615,317 A | | 3/1997 | Freitag |
| 5,678,015 A | | 10/1997 | Goh |
| 5,687,331 A | * | 11/1997 | Volk et al. .................. 715/840 |
| 5,758,295 A | * | 5/1998 | Ahlberg et al. ............. 455/566 |
| 5,825,355 A | | 10/1998 | Palmer et al. |
| 5,845,282 A | * | 12/1998 | Alley et al. .................. 707/10 |
| 5,852,783 A | | 12/1998 | Tabe et al. |
| 5,874,957 A | | 2/1999 | Cline et al. |

(Continued)

Primary Examiner—Steven P. Sax
Assistant Examiner—Le Nguyen
(74) Attorney, Agent, or Firm—Haverstock & Owens, LLP

(57) ABSTRACT

An instrument includes a display screen which includes a bitmap graphical user interface including an on-screen menu, and a control element which enables movement of the on-screen menu corresponding to movement of the control element, enables the user to manipulate and select graphic images for executing selected instrument functions. The instrument is adapted to enable manipulation of a plurality of graphic elements in an on-screen menu such that the user is able to form a graphic image on the display screen.

18 Claims, 2 Drawing Sheets

U.S. PATENT DOCUMENTS

| | | |
|---|---|---|
| 5,882,269 A | 3/1999 | Lewis |
| 5,883,625 A | 3/1999 | Crawford et al. |
| 5,892,037 A * | 4/1999 | Steinmann ................ 544/357 |
| 5,893,037 A | 4/1999 | Reele et al. |
| 5,905,964 A | 5/1999 | Sudo |
| 5,915,228 A | 6/1999 | Kunihiro et al. |
| 5,937,360 A | 8/1999 | Nishiyama et al. |
| 5,949,408 A | 9/1999 | Kang et al. |
| 5,977,975 A | 11/1999 | Mugura et al. |
| 6,002,395 A | 12/1999 | Wagner et al. |
| 6,011,553 A | 1/2000 | Komiyama |
| 6,020,881 A * | 2/2000 | Naughton et al. .......... 715/740 |
| 6,037,937 A * | 3/2000 | Beaton et al. .............. 715/764 |
| 6,047,260 A | 4/2000 | Levinson |
| 6,052,070 A * | 4/2000 | Kivela et al. ................. 341/22 |
| 6,100,878 A | 8/2000 | Hirayama |
| 6,122,526 A * | 9/2000 | Parulski et al. .......... 455/556.1 |
| 6,177,950 B1 * | 1/2001 | Robb ...................... 348/14.01 |
| 6,278,453 B1 | 8/2001 | Bodnar |
| 6,385,305 B1 * | 5/2002 | Gerszberg et al. ....... 379/88.13 |
| 6,441,854 B2 * | 8/2002 | Fellegara et al. ...... 348/333.13 |
| 6,681,120 B1 * | 1/2004 | Kim ....................... 455/556.1 |

* cited by examiner

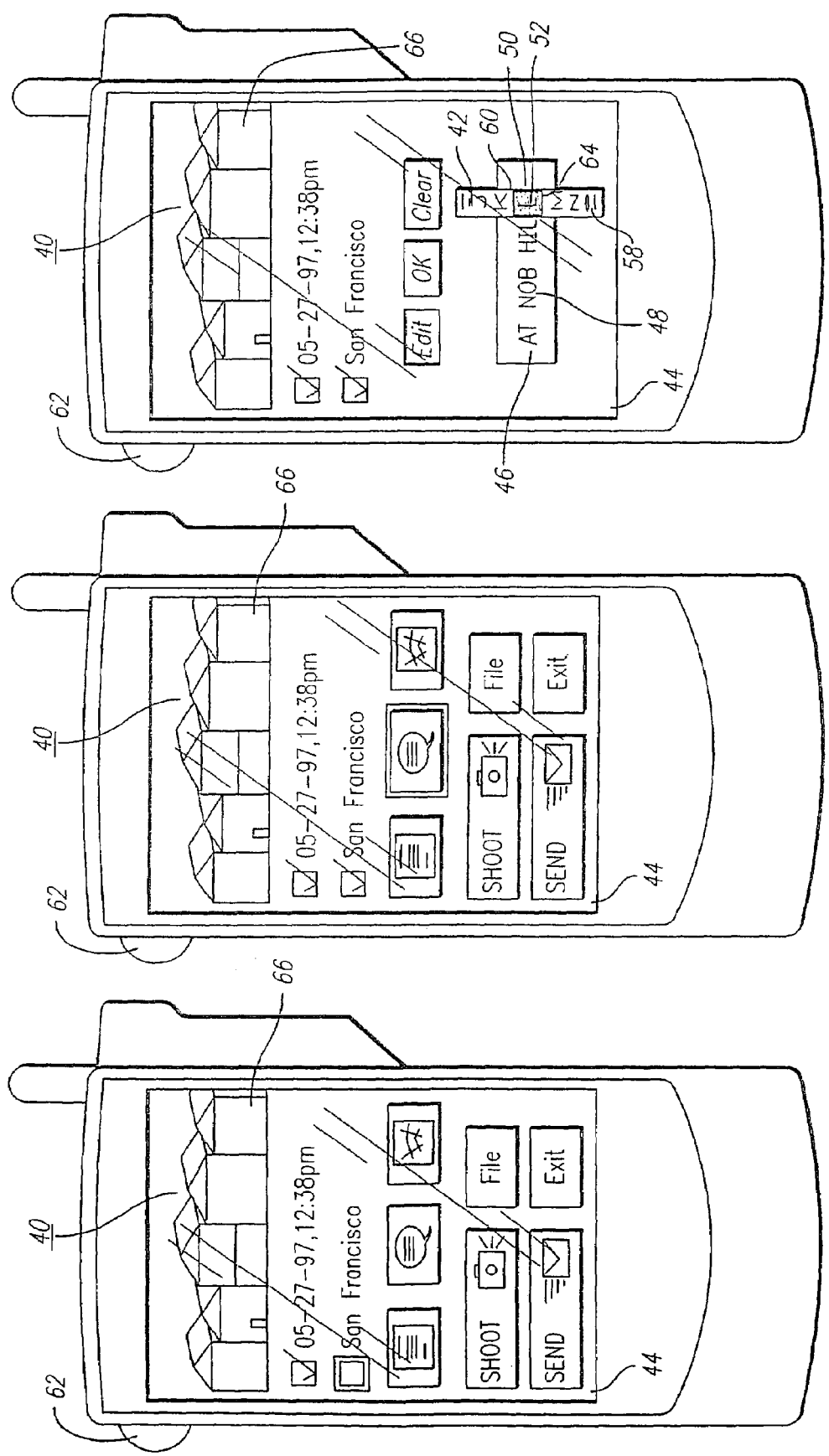

SYSTEM AND METHOD FOR ENABLING MANIPULATION OF GRAPHIC IMAGES TO FORM A GRAPHIC IMAGE

RELATED APPLICATIONS

This application is a divisional of U.S. patent application Ser. No. 10/171,476, entitled "SYSTEM AND METHOD FOR ENABLING MANIPULATION OF GRAPHIC IMAGES TO FORM A GRAPHIC IMAGE," filed Jun. 13, 2002, now U.S. Pat. No. 7,093,203, which is a continuation of application Ser. No. 09/556,049, filed Apr. 21, 2000, now abandoned, which is a continuation of application Ser. No. 09/006,544, filed Jan. 13, 1998, now abandoned, all of which are incorporated by reference.

BACKGROUND OF THE INVENTION

The present invention relates generally to an interface for a display screen and, more particularly, to a graphical user interface which, with a control device, enables manipulation of graphic images on a display screen.

In an instrument which includes a display screen, an on-screen menu, and a control device, a user may interact with the on-screen menu by viewing the on-screen menu, deciding to select a menu item, and manipulating the control device to generate menu movement and to enable entry of the menu selection.

The instrument may comprise a hand-held wireless telephone which includes an on-screen menu displayed in a text text-based interface on a small liquid-crystal display screen, and a jog dial control device for scrolling through the menu and for entry of a menu selection and execution of an instrument function thereby.

In an instrument which includes a display screen and a control element, and which is adapted to enable a picture to be taken and transmitted to another party, a user may wish to transmit text related to the picture along with the picture.

Therefore, there has been a need existing for a system which enables the user of an instrument to form a text subtitle related to a picture to be transmitted by an instrument. The present invention fulfills these needs.

SUMMARY OF THE INVENTION

Briefly, and in general terms, the present invention provides an on-screen menu in an interactive graphical user interface, which provides for enabling forming of a subtitle for a picture to be transmitted.

The system enables manipulation of a plurality of graphic elements on a display screen, to enable the user to form a graphic image on the display screen. It includes a display screen. It further includes means for presenting an array including a plurality of graphic images for forming the graphic image in the display screen and for presenting a line in which the graphic image is to be formed in the display screen, comprising a graphical user interface, wherein the array presenting means and line presenting means intersect at a position in which a graphic element is selectable as a part of the graphic image to be formed. It also includes means for enabling a graphic element to be a selectable graphic element. It further includes means for enabling movement of the array presenting means to move a graphic element into and out of position as the selectable graphic image in the line for forming the graphic image, and for enabling selection of the selectable graphic element.

One aspect of the present invention is that a system enables the user to view and manipulate graphic images in an on-screen menu in an intuitive graphical user interface in a display screen.

Another aspect of the present invention is that a system enables the user of an instrument to form a graphic image on a display screen by viewing, manipulating and selecting a graphic element from an array of graphic elements in an on screen menu, to form a graphic image in a line to be formed from an on-screen menu of graphic elements in a graphical user interface in the instrument.

Other features and advantages of the invention will become apparent from following detailed description taken in conjunction with the accompanying drawings, which illustrate, by way of example, the features of the invention.

BRIEF DESCRIPTION OF THE DRAWINGS

FIG. 1 is an elevational view illustrating an initial display in an instrument which includes an on-screen menu for viewing, focusing on, manipulating and selecting a selectable graphic element to form a graphic image in accordance with the present invention;

FIG. 2 is an elevational view of another display in an instrument which includes an on-screen menu for forming a graphic image in accordance with the present invention;

FIG. 3 is an elevational view of a further display in an instrument which includes an on-screen menu for forming a graphic image in accordance with the present invention;

DETAILED DESCRIPTION OF THE PREFERRED EMBODIMENTS

Figure 4:
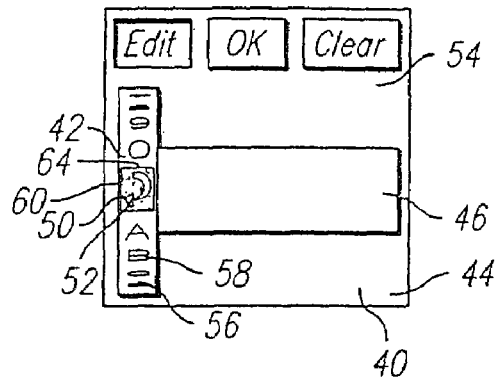
FIG. 4 is an elevational view illustrating an on-screen menu in a display screen in an initial position for forming a graphic image in accordance with the present invention.

Referring now to the drawings, there are shown preferred embodiments of a system 10 for enabling manipulation of a plurality of graphic images 12 on a display screen 14.

Figure 5:
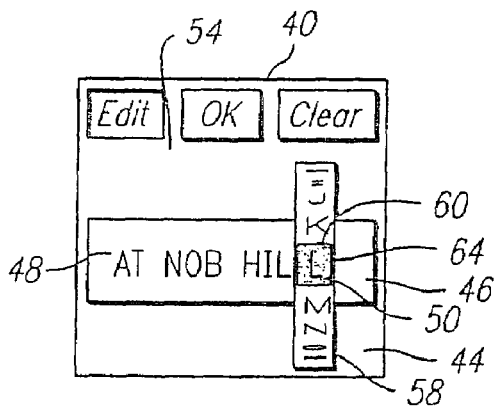
FIG. 5 is an elevational view of an on-screen menu in a display screen in another position for forming a graphic image in accordance with the present invention.
Figure 6:
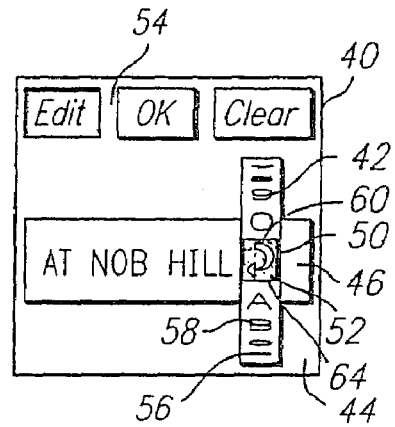
FIG. 6 is an elevational view of an on-screen menu in a display screen in a further position for forming a graphic image in accordance with the present invention.
Figure 7:
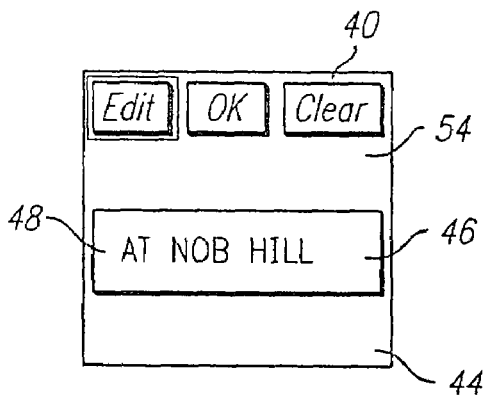
FIG. 7 is an elevational view of an on-screen menu in a display screen in another position for forming a graphic image in accordance with the present invention.
Figure 8:
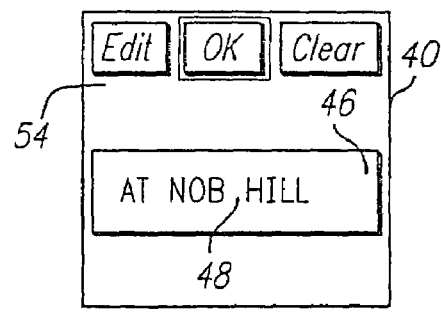
FIG. 8, is an elevational view of an on-screen menu in a display screen in a still further position for forming a graphic image in accordance with the present invention.

In a preferred embodiment as shown in FIGS. 1-8, system 40 is adapted to enable manipulation of a plurality of graphic elements 42 on a display screen 44, to enable a user to form a line 46 which comprises a graphic image 48 in display screen 44. In system 40, the plurality of graphic elements 42 are each movable into and out of a position 50 as a selectable graphic element 52, to form a part of graphic image 48 in line 46. Each graphic element 42 is different from the other graphic elements 42. Graphic elements 42 may comprise alphabetical elements, numerical elements, and icons. A graphical user interface 54 includes the plurality of graphic elements 42 therein, and presents an array 56 of the plurality of graphic elements 42 in display screen 44. Graphical user interface 54 may comprise a wheel image 58 which includes the plurality of graphic elements 42 and selectable graphic element 52 therein. Wheel 58 may be rotatable and scrollable, and may be movable to adjacent positions along line 46. Line 46 and wheel image 58 intersect at position 50 wherein a graphic element 42 is selectable as selectable graphic element 52 to form a part of graphic image 48. A cursor 60 enables a graphic element 42 to be positionable in position 50 in graphical user interface 54 so as to be a selectable graphic element 52. A jog dial 62 is rotatable and pressable, to enable movement of the plurality of graphic images 42 into and out of position as selectable graphic element 52, and to enable selection of selectable graphic element 52 in display screen 44. Rotation of jog dial 62 results in corresponding rotation of graphic elements 42 in display screen 44.

System 40 enables a user to manipulate the plurality of graphic elements 42 in display screen 44. For example, the plurality of graphic elements 42 may comprise letters of the alphabet and numbers, enabling a selected letter or number to form a part of graphic image 48, the parts of which together may comprise a word or a numerical address.

System 40 also enables the user to take and send a picture 64, with line 46 and graphic image 48 therein comprising a subtitle for picture 64 which may also be sent along with picture 64. Picture 64 may be taken with a CCD camera, not shown, which may be mounted in an instrument 66. The camera may be operated by buttons 68 in display screen 44, which buttons 68 may be accessible in the screens shown in FIGS. 1-2. Instrument 66 may comprise a wireless telephone.

Display screen 44 preferably comprises a bitmap screen for presenting graphical user interface 54. It may comprise a liquid crystal display screen, and may comprise a color display screen. Movement of one of the plurality of graphic elements 42 out of position as selectable graphic element 52 moves such graphic element 42 to the next position in wheel 58 which is adjacent to position 50 for selectable graphic element 52.

Cursor 60 may include an outline 70 which extends about selectable graphic element 52, or may be adapted to highlight selectable graphic element 52, as by flashing selectable graphic element 52. Position 50 of selectable graphic element 52 may preferably be in substantially the center of display screen 44.

Jog dial 62 may be rotatable such that rotation thereof results in corresponding rotation of the plurality of graphic elements 42 in display screen 44, and may also be pressable to select the selectable graphic element 52. Jog dial 62 may preferably be located on the side of instrument 66 in which a compact display screen 44 may be mounted, enabling manipulation of jog dial 62 with the thumb of the user, or may be located in the back of instrument 66 enabling manipulation of jog dial 28 with the forefinger of the user.

In operation, for example, instrument 66 may be held in one hand by the user, jog dial 62 may be manipulated by one finger of the user, and instrument 66 may be activated by turning on a power switch (not shown). The power switch may activate display screen 44 which may comprise a bitmap screen including graphical user interface 54 in a liquid crystal display screen 44, to present for example the screen shown in FIGS. 1-2 which may display picture 64 taken with the CCD camera in instrument 66, and buttons 68 for performing functions relating thereto.

Accessing the next screen as shown in FIG. 3 may present graphic elements 42 in wheel 58 and selectable graphic element 52 and graphic image 48 in line 46.

Rotating jog dial 62 results in corresponding rotation of wheel 58 which is scrollable and appears to be a three-dimensional rotatable wheel including a rounded wheel-like surface, so as to move a graphic element 42 which is in position 50 as selectable graphic element 52 out of position 50, and moves the next adjacent graphic element 42 into position as selectable graphic element 52. Pressing jog dial 62 generates selection of selectable graphic element 52 to form a part of graphic image 48. For example, pressing jog dial 62 while in the screen shown in FIG. 3 enables selection of the letter "L" as part of graphic image 48 "AT NOB HILL" in line 46, as the subtitle for picture 64. Then wheel 58 moves to the next adjacent position in line 46 for selection of the next selectable graphic element 52, and the process is repeated. Upon completion of graphic image 48, picture 64 with the subtitle formed in line 46 may be sent as desired by the user.

From the foregoing it will be appreciated that the system of the present invention provides advantages in enabling forming a subtitle for a picture to be transmitted. While particular forms of the invention have been illustrated and described, it will be apparent that various modifications can be made without departing from the spirit and scope of the invention. Accordingly, the invention is not to be limited, except as by the following claims.

The invention claimed is:

1. A system for enabling selection of a selectable graphic image on a display screen adapted to be mounted in an instrument, comprising:
    a display screen, including a column with a plurality of selectable graphic images therein, wherein each graphic image is adapted to be selectable and the column is adapted to be moveable for enabling a line graphic image to be formed thereby and to be displayed on the display screen;
    a manipulation enabling element for enabling manipulation of the column of the plurality of graphic images on the display screen to enable movement of a graphic image into position as a selectable graphic image on the display screen and to enable selection of the selectable graphic image to be a part of the line graphic image to be formed on the display screen, wherein the manipulation enabling element appears to be a rotatable wheel which occupies a three-dimensional space, and the column of the plurality of graphic images is foreshortened at a top and bottom of the rotatable wheel and appears to rotate with the rotatable wheel; and
    a selection and entry enabling element for enabling selection and entry of the selectable graphic image in the display screen, adapted to be rotatable for selection and pressable for entry, such that rotation and pressing thereof enables selection and entry of the selectable graphic image.

2. The system of claim 1, wherein the selection and entry enabling element comprises a jog dial.

3. The system of claim 1, further comprising an instrument in which the display screen is mounted, wherein the instrument is adapted to be held by the user in one hand, and the selection and entry enabling element is adapted to be manipulated in one hand by the user.

4. The system of claim 2, further comprising an instrument in which the display screen is mounted, wherein the jog dial is located on a side of the instrument.

5. The system of claim 2, further comprising an instrument in which the display screen is mounted, wherein the jog dial is located in the back of the instrument.

6. The system of claim 3, wherein the instrument comprises a wireless telephone.

7. The system of claim 3, wherein the selection and entry enabling element is adapted to be manipulated by the thumb of the user.

8. The system of claim 3, wherein the selection and entry enabling element is adapted to be manipulated by one finger of one hand of the user.

9. The system of claim 8, wherein the selection and entry enabling element is adapted to be manipulated by the forefinger of the user.

10. A method of enabling selection of a graphic image on a display screen adapted to be mounted in an instrument, in a system which comprises:
- a display screen, including a column with a plurality of selectable graphic images therein, wherein each graphic image is adapted to be selectable and the column is adapted to be moveable for enabling a line graphic image to be formed thereby and to be displayed on the display screen;
- a manipulation enabling element for enabling manipulation of the column of the plurality of graphic images on the display screen to enable movement of a graphic image into position as a selectable graphic image on the display screen and to enable selection of the selectable graphic image to be a part of the line graphic image to be formed on the display screen;
- wherein the manipulation enabling element appears to be a rotatable wheel which occupies a three-dimensional space, and the column of the plurality of graphic images is foreshortened at a top and bottom of the rotatable wheel and appears to rotate with the rotatable wheel; and
- a selection and entry enabling element for enabling selection and entry of the selectable graphic image in the display screen, adapted to be rotatable for selection and pressable for entry, such that rotation and pressing thereof enables selection and entry of the selectable graphic image;
- wherein the method comprises:
- rotating and pressing the selection and entry enabling element so as to select and enter the selectable graphic image.

11. The method of claim 10, wherein the selection enabling element comprises a jog dial, and wherein rotating and pressing comprises rotating and pressing the jog dial.

12. The method of claim 10, further comprising an instrument in which the display screen is mounted, wherein the instrument is adapted to be held by the user in one hand, and the selection and entry enabling element is adapted to be manipulated in one hand the user, and further comprising manipulating the selection and entry enabling element in one hand by the user.

13. The method of claim 11, further comprising an instrument in which the display screen is mounted, wherein the jog dial is located on a side of the instrument, and further comprising rotating and pressing the jog dial on a side of the instrument.

14. The method of claim 11, further comprising an instrument in which the display screen is mounted, wherein the jog dial is located in the back of the instrument, and further comprising rotating and pressing the jog dial in the back of the instrument.

15. The method of claim 12, wherein the instrument comprises a wireless telephone, and wherein manipulation further comprises manipulating the selection enabling element in one hand by the user in a wireless telephone.

16. The method of claim 12, wherein the selection and entry enabling element is adapted to be manipulated by the thumb of the user, and wherein manipulating further comprises manipulating the selection and entry enabling element by the thumb of the user.

17. The method of claim 12, wherein the selection and entry enabling element is adapted to be manipulated by one finger of one hand of the user, and wherein manipulating further comprises manipulating the selection and entry enabling element by one finger of one hand of the user.

18. The method of claim 17, wherein the selection and entry enabling element is adapted to be manipulated by the forefinger of the user, and wherein manipulating further comprises manipulating the selection and entry enabling element by the forefinger of the user.

* * * * *

UNITED STATES PATENT AND TRADEMARK OFFICE
CERTIFICATE OF CORRECTION

PATENT NO.        : 7,334,192 B2
APPLICATION NO.   : 11/444651
DATED             : February 19, 2008
INVENTOR(S)       : Kazuto Mugura, Eduardo Sciammarella and Scott Kravitz It is certified that error appears in the above-identified patent and that said Letters Patent is hereby corrected as shown below:

<u>IN THE CLAIMS</u>

At column 4, line 54, Claim 2, please replace "ajog" with -- a jog -- so that the corresponding phrase reads -- comprises a jog dial --.

Signed and Sealed this

Twenty-seventh Day of May, 2008

JON W. DUDAS
*Director of the United States Patent and Trademark Office*